United States Patent
Tokura et al.

(10) Patent No.: US 7,159,506 B2
(45) Date of Patent: Jan. 9, 2007

(54) STATE DETECTING DEVICE FOR LOAD ELEMENT RECEIVING LOAD OF WORKING FLUID AND STATE DETECTING DEVICE FOR FLUID PRESSURE CONTROL CIRCUIT

(75) Inventors: Takaaki Tokura, Toyota (JP); Katsumi Kono, Toyota (JP); Tomohiro Asami, Nisshin (JP); Nobufusa Kobayashi, Toyota (JP); Hideki Takamatsu, Anjo (JP); Norimi Asahara, Nagoya (JP); Shu Asami, Nagoya (JP); Ryoichi Hibino, Nagoya (JP); Hiroyuki Nishizawa, Tajimi (JP); Masataka Osawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 194 days.

(21) Appl. No.: 10/875,379

(22) Filed: Jun. 25, 2004

(65) Prior Publication Data

US 2004/0261551 A1   Dec. 30, 2004

(30) Foreign Application Priority Data

Jun. 30, 2003 (JP) ............................. 2003-187771
Mar. 26, 2004 (JP) ............................. 2004-092477

(51) Int. Cl.
*F15B 11/08* (2006.01)
*F15B 13/04* (2006.01)
(52) U.S. Cl. ............................. 91/433; 91/419; 60/329; 60/418
(58) Field of Classification Search .................. 60/328, 60/329, 418; 91/1, 419, 433; 137/625.65, 137/554
See application file for complete search history.

(56) References Cited

U.S. PATENT DOCUMENTS

| 4,061,155 | A | * | 12/1977 | Sopha | 91/433 |
| 4,598,626 | A | * | 7/1986 | Walters et al. | 91/433 |
| 5,035,312 | A | * | 7/1991 | Asayama et al. | 91/433 |
| 5,054,599 | A | * | 10/1991 | Marcott | 91/361 |
| 5,343,994 | A | * | 9/1994 | Kyrtsos | 91/361 |
| 5,355,676 | A | * | 10/1994 | Inokuchi | 60/413 |
| 5,951,616 | A | | 9/1999 | Chiba et al. | |
| 5,992,294 | A | * | 11/1999 | Seddon | 91/433 |
| 6,891,710 | B1 | | 5/2005 | Mayr et al. | |

FOREIGN PATENT DOCUMENTS

| DE | 197 15 716 A1 | 10/1997 |
| DE | 100 03 896 A1 | 8/2001 |
| JP | 5-263913 | 10/1993 |
| JP | 8-201130 | 8/1996 |

(Continued)

*Primary Examiner*—Michael Leslie
(74) *Attorney, Agent, or Firm*—Oblon, Spivak, McClelland, Maier & Neustadt, P.C.

(57) ABSTRACT

The load element state detecting portion 72 detects the completion of the filling of the hydraulic oil into the clutch 62 and the working limit of the accumulator 64 on the basis of the displacement of the spool valve element 42. That is, since the completion of the filling of the hydraulic oil into the clutch and the working limit of the accumulator 64 are directly detected, so that the completion of the filling of the hydraulic oil into the clutch 62 and the working limit of the accumulator 64 can be detected with high precision regardless of differences among products and the time-lapse variation. Furthermore, they can be detected without equipping any special device to the hydraulic control circuit, and thus there is an advantage that the device construction is simple.

11 Claims, 8 Drawing Sheets

FOREIGN PATENT DOCUMENTS

| | | |
|---|---|---|
| JP | 10-213215 | 8/1998 |
| JP | 11-153247 | 6/1999 |
| JP | 2000-346703 | 12/2000 |
| JP | 2001-32863 | 2/2001 |

* cited by examiner

STATE DETECTING DEVICE FOR LOAD ELEMENT RECEIVING LOAD OF WORKING FLUID AND STATE DETECTING DEVICE FOR FLUID PRESSURE CONTROL CIRCUIT

This application is on the basis of Japanese Patent Application Nos. 2003-187771 and 2004-092477 filed on Jun. 30, 2003 and Mar. 26, 2004 respectively, the contents of which are incorporated hereinto by reference.

BACKGROUND OF THE INVENTION

1. Field of the Invention

The present invention relates to a load element state detecting device for detecting the state of a load element whose pressure is adjusted by a fluid pressure control circuit, and a fluid pressure control circuit state detecting device for detecting the state of a fluid pressure control circuit.

2. Discussion of Related Arts

There is known a fluid pressure control circuit equipped with an electromagnetic pressure-regulating valve for adjusting the pressure of working fluid such as hydraulic oil or the like supplied in a predetermined flow path by moving a spool, that is, a valve element in accordance with an excitation state of a solenoid driven by a predetermined electrical drive circuit, thereby controlling the pressure of the working fluid supplied to a prescribed load element. As the electromagnetic pressure-regulating valve is known a valve having a feedback chamber into which the output pressure output from the output port is fed back to hold the output pressure to a value corresponding to an drive current representing a instruction value supplied from the electrical drive circuit.

Furthermore, a technique for detecting the state of the fluid pressure control circuit is also known. For example, a 2-phase fluid flow-rate measuring method on the basis of a turbine type flowmeter described in JP-A H8-201130 is known. According to this technique, a turbine is equipped in a flow path in a fluid pressure control circuit, and the rotational speed of the turbine rotated by the flow of the working fluid is detected, so that the flow rate of the working fluid can be calculated on the basis of induced electromotive force being produced in accordance with the rotational speed of the turbine from the predetermined relationship.

For the fluid pressure control circuit disclosed for example in JP-A H10-213215, a hydraulic pressure control circuit is widely used in an automatic transmission for a vehicle. In the vehicle automatic transmission, a clutch and a brake which are hydraulic type friction engaging devices are set as load elements receiving hydraulic pressure adjusted by the hydraulic pressure control circuit, and each of these clutch and brake is equipped with a plurality of frictional engagement elements which are frictionally engaged with one another, and a piston serving as an actuator for engaging these plurality of frictional engaging elements with one another. The piston is moved by the load on the basis of the hydraulic pressure, whereby the plurality of frictional engaging elements are engaged with one another.

As disclosed in JP-A H5-263913, the movement of the piston, that is, the completion of the stroke is judged on the basis of the lapse time from the current supply to the electromagnetic pressure-regulating valve. That is, the time period from the time at which the current is supplied to the electromagnetic pressure-regulating valve until the time when the piston is stroked to a stroke end position is measured and set in advance, and the judgment that the piston stroke has been completed is made on the basis of the fact that the actual current supply time reaches the preset time. As disclosed in JP-A H11-153247, a flow rate of the working fluid is estimated on the basis of a position of a solenoid core detected by a AC component of a drive current supplied to a solenoid valve. As disclosed in JP-A 2001-32863, a pressure rising of the working fluid is detected on the basis of a counter electromotive force induced by a displacement of a solenoid core of a solenoid valve. As disclosed in JP-A 2000-346703, an operational change of a solenoid valve is detected on the basis of a extracted signal through a band pass filter from a drive current in a solenoid core of a solenoid valve.

However, the technique disclosed in Patent Document 4 has a problem that it cannot be adapted to fluctuation in the time needed for the stroke completion which is caused by differences among products or time-lapse variation.

Furthermore, the time needed for the stroke completion is influenced by the viscosity of working fluid or the like, and thus it is necessary to detect the state of the fluid pressure control circuit such as the viscosity of the working fluid in some cases. As described in Patent Document 1, with respect to the state detecting device for the conventional fluid pressure control circuit, a device such as a turbine or the like is required to be equipped in the fluid pressure control circuit and the cost is increased due to the turbine device. In addition, a requirement for a mounting space makes the fluid pressure control circuit large in size, and thus the fluid pressure type mechanical device such as the vehicle automatic transmission or the like employing the fluid pressure control circuit is high in cost and large in size.

SUMMARY OF THE INVENTION

The present invention has been implemented in view of the foregoing situation, and has an object to provide a load element state detecting device which can detect the state of the load element with high precision regardless of differences among products and time-lapse variation, and a fluid pressure control circuit state detecting device for detecting the state of working fluid in a fluid pressure control circuit by a simple construction.

The inventor has made various considerations to attain the above object, and consequently has found as follows. In such a type of an electromagnetic pressure-regulating valve where there is provided a feedback chamber into which the output voltage output from an output port is fed back and the output pressure is kept to a value corresponding to a instruction value irrespective of the pressure variation of the flow path at the output side, when the flow rate of the working fluid at the output side intercommunicating with the output port is varied, the pressure variation on the basis of the flow rate variation is offset and thus the output pressure is kept to a value corresponding to a drive current, so that the position of the spool is passively varied interlockingly with the flow rate variation thereof. Therefore, the flow-rate variation at the output side can be detected on the basis of the passive displacement of the spool. The present invention has been implemented on the basis of this knowledge.

The above object maybe achieved according to a first aspect of the present invention, which provides a state detecting device for detecting a state of a load element receiving working fluid whose pressure is adjusted by an electromagnetic pressure-regulating valve equipped to a fluid pressure control circuit, (a) wherein the electromagnetic pressure-regulating valve includes a solenoid driven by a electrical drive circuit, a spool movable in accordance with an excitation state of the solenoid, and a feedback chamber into which output pressure output from an output port thereof is fed back, and (b) the state detecting device includes a load element state detecting portion for detecting the state of the load element on the basis of a displacement of the spool.

In the first preferred form of the present invention, the load element state detecting device further comprises a position detecting portion for detecting the position of the spool, wherein the load element state detecting portion judges the displacement of the spool non-associated with the driving of the electrical drive circuit on the basis of the position of the spool detected by the position detecting portion and an instruction value supplied to the electrical drive circuit to drive the electromagnetic pressure-regulating valve, thereby detecting the state of the load element.

In the second preferred form of the present invention, the load element state detecting device further comprises a displacement detecting portion for detecting the displacement of the spool on the basis of the electrical state variation of the electrical drive circuit, wherein the load element state detecting portion judges the displacement of the spool non-associated with the driving of the electrical drive circuit on the basis of the displacement of the spool detected by the displacement detecting portion and an instruction value supplied to the electrical drive circuit to drive the electromagnetic pressure-regulating valve, thereby detecting the state of the load element.

In the third preferred form of the present invention, the load element comprises a fluid pressure type frictional engaging device whose engagement state is controlled by working fluid having pressure adjusted by the electromagnetic pressure-regulating valve, and the load element state detecting portion includes a filling completion judging portion for judging on the basis of the displacement of the spool whether filling of the working fluid into the fluid pressure type friction engaging device is completed or not.

In the fourth preferred form of the present invention, the load element comprises an accumulator for accumulating the pressure of the working fluid whose pressure is adjusted by the electromagnetic regulating valve, and the load element state detecting portion includes working limit judging portion for judging on the basis of the displacement of the spool whether the accumulator reaches the working limit.

In the fifth preferred form of the present invention, the fluid pressure control circuit includes a switching valve which is disposed in a flow path between the electromagnetic pressure-regulating valve and the load element and switches the flow path of the working fluid whose pressure is adjusted by the electromagnetic pressure-regulating valve, and the load element status detecting device further comprises a switching valve abnormality detecting portion for detecting abnormality of the switching valve on the basis of the displacement of the spool and an instruction value supplied to the electrical drive circuit to drive the electromagnetic pressure-regulating valve.

In the sixth preferred form of the present invention, the fluid pressure control circuit has a fail safe valve which is disposed in a fluid path between the electromagnetic pressure-regulating valve and the load element and receives working fluid whose pressure is adjusted by the electromagnetic pressure-regulating valve, thereby preventing simultaneous engagement of a plurality of fluid pressure type friction engaging devices, and the load element state detecting device further comprises a fail safe actuation detecting portion for detecting the presence or absence of a fail safe action of the fail safe valve on the basis of the displacement of the spool and an instruction value supplied to the electrical drive circuit to drive the electromagnetic pressure-regulating valve.

In the seventh preferred form of the present invention, the load element state detecting device further comprises an input flow rate judging portion for judging on the basis of the displacement of the spool and an instruction value supplied to the electrical drive circuit to drive the electromagnetic pressure-regulating valve whether the flow rate of the working fluid input to the electromagnetic pressure-regulating valve is sufficient or not.

The object indicated above may also be achieved according to a second aspect of the present invention, which provides a fluid pressure control circuit state detecting device for detecting the state of a fluid pressure control circuit having an electromagnetic pressure-regulating valve for adjusting the pressure of working fluid in a prescribed flow path by moving a spool in accordance with an excitation state of a solenoid driven by a predetermined electrical drive circuit, comprises a viscosity estimating portion for estimating the viscosity of the working fluid on the basis of the displacement of the spool.

In the first preferred form of the second aspect of the present invention, the fluid pressure control circuit has a load element receiving the working fluid whose pressure is adjusted by the electromagnetic pressure-regulating valve, and the viscosity estimating portion estimates the viscosity of the working fluid on the basis of the displacement of the spool which is detected when the load element is fully filled.

According to the first aspect of the invention, by the load element state detecting portion, the state of the load element is detected on the basis of the displacement of the spool. That is, the state of the load element is directly detected, and the element of the load state can be detected with high precision regardless of differences among products and the time-lapse variation. The state of the load element can be detected because when the reception amount of the working fluid per unit time by the load element is varied, the flow-rate of the working fluid varies at the upstream side of the load element, that is, at the output side of the electromagnetic pressure-regulating valve, and when the flow-rate of the working fluid varies, the displacement of the spool occurs for the reason described above.

The first preferred form and the second preferred form of the first aspect of the invention relate to specific portion for detecting the displacement of the spool, and have the same effect as the first invention.

In the third preferred form of the first aspect of the invention, the load element is a fluid pressure type frictional engaging device, and it is directly judged whether the filling of the working fluid into the fluid pressure type friction engaging device is completed or not. Therefore, the completion of the filling of the working fluid into the fluid pressure type friction engaging device can be judged with high precision regardless of differences among products and the time-lapse variation. In the fourth preferred form of the first aspect of the invention, the load element is an accumulator, and it is directly judged whether the accumulator reaches a working limit. Therefore, the working limit of the accumulator can be judged with high precision regardless of differences among products and the time-lapse variation.

In a case where a switching valve is disposed in the flow path between the electromagnetic pressure-regulating valve and the load element as in the fifth preferred form of the first aspect of the invention, when the displacement of the spool cannot be detected on the basis of the state variation of the load element although the instruction value of the electrical driving circuit is set to a value for supplying the working fluid to the load element, it can be considered that an abnormality occurs in the switching valve. Therefore, the abnormality of the switching valve can be detected by the switching valve abnormality detecting portion of the fifth preferred form of the first aspect of the invention.

In a case where a fail safe valve for preventing simultaneous engagement of a plurality of fluid pressure type friction engaging devices is equipped in the flow path between the electromagnetic pressure-regulating valve and the load element as in the sixth preferred form of the first aspect of the invention, when the fail safe valve is actuated, the flow rate of the flow path at a blocking side which is blocked by the actuation of the fail safe valve is quickly reduced, and thus the displacement of the spool occurs due to the reduction of the flow rate. Therefore, the abnormality of the fail safe valve can be detected by the fail safe actuation detecting portion of the sixth preferred form of the first aspect of the invention.

Furthermore, according to the seventh preferred form of the first aspect of the invention, the source pressure of the electromagnetic pressure-regulating valve can be judged. The source pressure of the electromagnetic pressure-regulating valve can be judged as in the eighth invention because when the instruction value from the electrical driving circuit is equal to a fixed value at which the input port and output port of the electromagnetic pressure-regulating valve intercommunicate with each other, the position of the spool would be varied regardless of the fixed instruction value if the input flow rate is quickly reduced due to an abnormality of the source pressure.

According to the second aspect of the invention, the viscosity of the working fluid can be estimated on the basis of the displacement of the spool of the electromagnetic pressure-regulating valve which can be detected with a simple construction, so that the viscosity of the working fluid in the fluid pressure control circuit can be estimated by a simple construction.

Furthermore, according to the first preferred form of the second aspect of the invention, the viscosity of the working fluid can be estimated on the basis of the displacement of the spool at the full fill-in time of the load element which is large in displacement of the spool due to large flow-rate variation, so that the viscosity of the working fluid can be estimated with high precision.

DETAILED DESCRIPTION OF PREFERRED EMBODIMENTS

Figure 1:
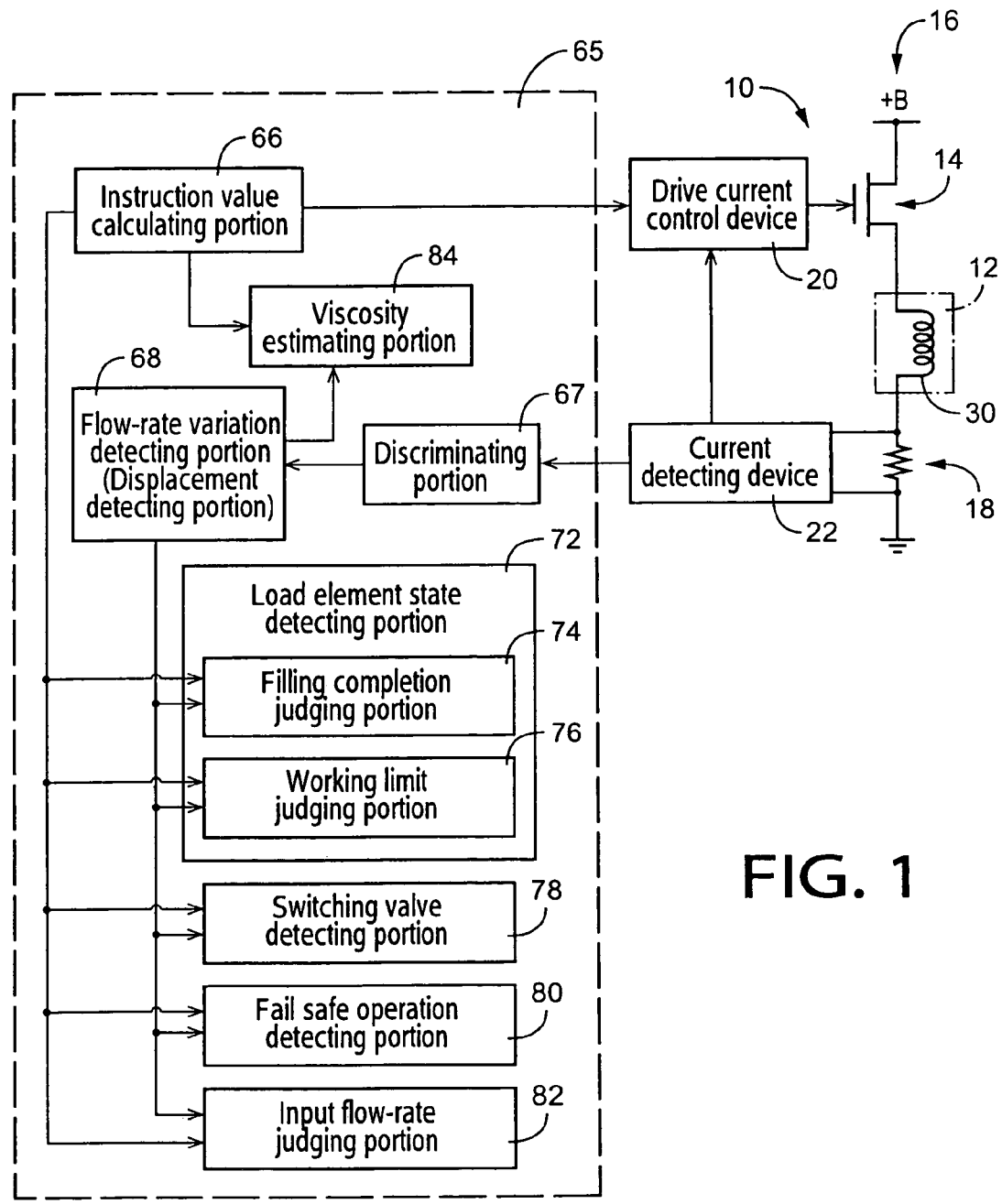
FIG. 1 is a conceptual diagram showing the construction of a state detecting device for a load element and a hydraulic control circuit according to an embodiment of the present invention.

Preferred embodiments according to the present invention will be described hereunder in detail with reference to the drawings. With respect to the drawings used to describe the embodiments, overlapping portions are represented by the same reference numerals, and the description thereof is omitted.

FIG. 1 is a conceptual diagram showing the construction of a state detecting device for a load element and a hydraulic control circuit according to an embodiment of the present invention. In an electrical drive circuit 10, a coil 30 of a linear solenoid valve 12 serving as an electromagnetic pressure-regulating valve is connected to a battery 16 serving as a power supply source through a transistor 14 so that driving current $I_{DR}$ corresponding to a duty signal applied to the transistor 14 flows through the coil 30. The duty signal is a rectangular wave having a frequency of 300 Hz, and a driving current control device 20 controls the driving current $I_{DR}$ flowing in the coil 30 by varying the on/off time within one period of the duty signal. With the duty signal, a dither signal having a frequency of 300 Hz is produced in the driving current $I_{DR}$ flowing in the coil 30. A resistor 18 is equipped to the earth side of the coil 30, and the current detecting device 22 detects the driving current $I_{DR}$ actually flowing into the resistor 18, and thus the coil 30 on the basis of the voltage occurring between both the ends of the resistor 18.

Figure 2:
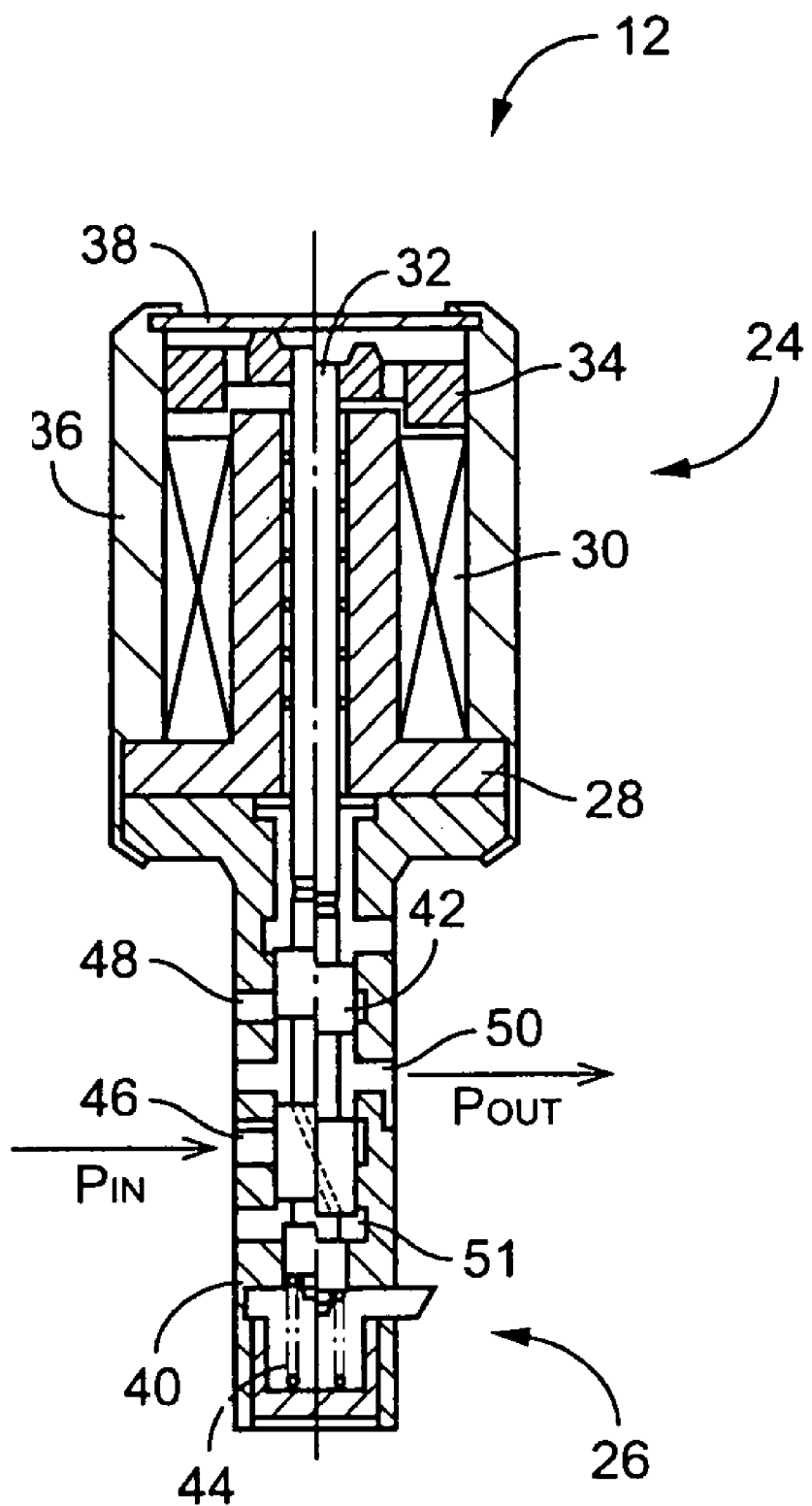
FIG. 2 is a cross-sectional view showing the construction of a linear solenoid valve which is driven by an electric control circuit of FIG. 1.

FIG. 2 is a cross-sectional view showing the construction of the linear solenoid valve 12. The linear solenoid valve 12 comprises a solenoid 24 serving as a device for converting electrical energy to driving force by supplying current to the device, and a pressure adjusting portion 26 for adjusting the input pressure $P_{IN}$ and outputting a predetermined output pressure $P_{OUT}$ by driving the solenoid 24. The solenoid 24 comprises a cylindrical core tube 28, a coil 30 formed of conducting wire wound around the outer periphery of the core tube 28, a core 32 equipped so as to be movable along the axial direction in the core tube 28, a plunger 34 fixedly equipped to the end portion of the core 32 at the opposite side to the pressure adjusting portion 26, a case 36 for accommodating the core tube 28, the coil 30, the core 32 and the plunger 34, and a cover 38 which is engagedly fitted in the opening portion of the case 36.

The pressure adjusting portion 26 comprises a sleeve 40 engagedly fitted in the case 36, a sleeve valve element 42 equipped so as to be movable along the axial direction in the sleeve 40, and a spring 44 for urging the spool valve element 42 to the solenoid 24, and the end portion of the spool valve element 42 at the solenoid 24 side is brought into contact with the end portion of the core 32 at the pressure adjusting portion 26 side. In the sleeve 40 are formed an input port 46 into which hydraulic oil is input, a drain port 48 intercommunicating with a portion under ambient pressure, an output port 50 from which the pressure-adjusted hydraulic oil is output, and a feedback oil chamber 51 to which the pressure of the hydraulic oil output from the output port 50 is supplied.

Figure 3A:
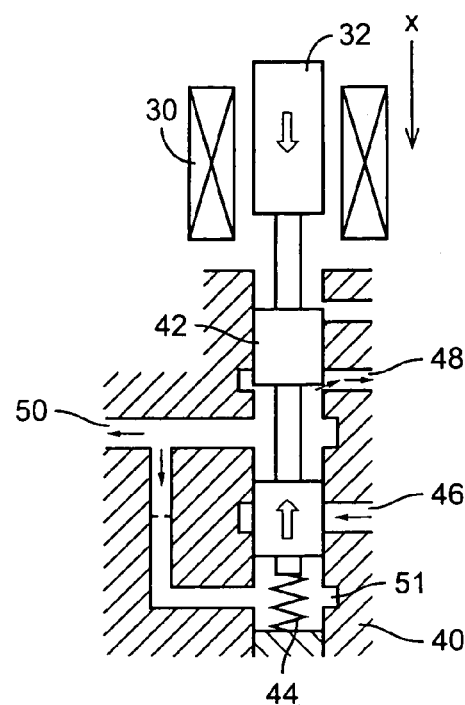
FIG. 3 is a schematic diagram showing the pressure adjusting principle of a linear solenoid valve of FIG. 2, wherein (a) represents a state where the urging force of a solenoid is relatively small, and (b) represents a state where the urging force of the solenoid is relatively large.
Figure 3B:
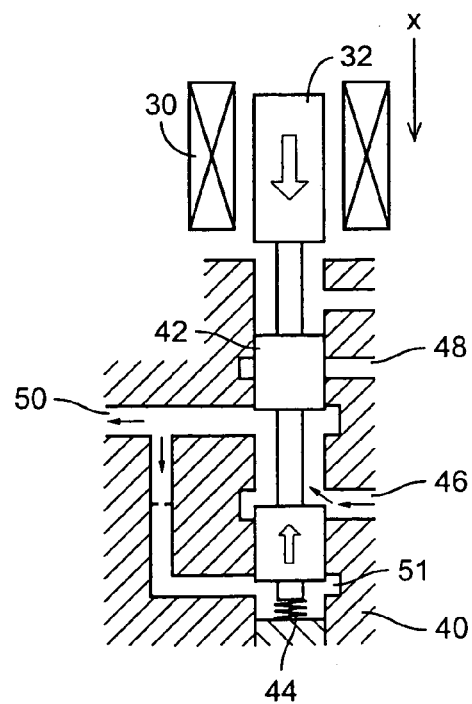

FIG. 3 is a schematic diagram showing the pressure adjusting principle of the linear solenoid valve 12, and an arrow in the oil path shows the flow of the hydraulic oil. When driving current $I_{DR}$ is supplied through the coil 30, the core 32 and the spool valve element 42 are moved in accordance with the current value along the axial direction in the linear solenoid valve 12. The intercommunication state of the output port 50 and the input port 46 or the drain port 48 is switched by the movement of the spool valve element 42. For example, in (a) where the movement amount in the x-direction of the spool valve element 42 to the coil 30 is relatively small, the flow-in of the hydraulic oil from the input port 46 is blocked, and the output port 50 and the drain port 48 intercommunicate with each other, so that the hydraulic oil at the output side is drained. In (b) where the movement of the spool valve element 42 along the x-direction to the coil 30 is relatively large, the input port 46 and the output port 50 intercommunicate with each other, and the drain port 48 is blocked, so that the hydraulic oil from the input port 46 is adjusted in pressure and output from the output port 50.

The output pressure $P_{OUT}$ is made to act on the end face of the spool valve element 42 at the feedback oil chamber 51 side, that is, the end face at the spring 44 side in the valve opening direction. When S represents the effective pressure reception area of this end face, F represents the thrust in the valve opening direction by the electromagnetic force of the solenoid 24 which increases in proportion to the driving current $I_{DR}$, and f represents the urging force of the spring 44 in the valve closing direction, the output pressure $P_{OUT}$ on the basis of the linear solenoid valve 12 is adjusted to a value determined from the equation represented as (F−f)/S on the basis of the balance in the axial center direction of the spool valve 42, that is, in the x-direction shown in FIG. 3. From this equation, it is apparent that when the thrust F in the valve opening direction by the solenoid 24 is constant, that is, when the driving current $I_{DR}$ is constant, the output pressure $P_{OUT}$ is kept constant.

Accordingly, even when the reception amount of the hydraulic oil per unit time is increased/reduced at the downstream side intercommunicating with the output port 50, or when the flow rate of the hydraulic oil supplied to the input port 46 is increased/reduced, the output pressure $P_{OUT}$ is kept constant, however, variation of the position of the spool valve element 42 occurs due to the flow-rate variation of the hydraulic oil. This will be described by using a case where the reception amount of the hydraulic oil per unit time is reduced at the downstream side. When the reception amount of the hydraulic oil is reduced at the downstream side, the flow-out amount from the linear solenoid valve 12 is excessively large, and the output pressure $P_{OUT}$ is transitionally increased. However, the pressure in the feedback oil chamber 51 is also increased due to increase of the output voltage $P_{OUT}$, and thus the spool valve element 42 is moved in the valve closing direction, so that the flow-out amount from the solenoid valve 24 and the flow-in amount into the solenoid valve 24 varying interlockingly with the flow-out amount are reduced.

Here, the relationship between the voltage e and the current i at the solenoid 24 is represented by the following equation (1) wherein R represents the resistance value of the electromagnetic drive circuit 10 (the sum of the resistance values of coil 30 and resistor 18, and L represents the reactance of the coil 30. The term (2) contained in the equation (1) indicates that counterelectromotive force $V_{BC}$ is produced by the movement of the spool valve element 42. This counterelectromotive force $V_{BC}$ is produced according to the well-known electromagnetic induction rule by variation of the relative position between the core 32 directly connected to the spool valve element 42 and the coil 30.

$$e = \frac{d}{dt}(L \cdot i) + R \cdot i = L\frac{di}{dt} + \frac{dL}{dt}i + R \cdot i \qquad (1)$$

$$= L\frac{di}{dt} + \frac{dL}{dx}\frac{dx}{dt}i + R \cdot i$$

$$\frac{dL}{dx}\frac{dx}{dt}i \qquad (2)$$

As described above, with respect to the linear solenoid valve 12, even when the output pressure $P_{OUT}$ is kept constant, the position of the spool valve element 42 is varied in accordance with the input/output flow rate of the hydraulic oil. Accordingly, when the input/output flow rate of the hydraulic oil to/from the linear solenoid valve 12 is varied, the counterelectromotive force $V_{BC}$ is produced.

Figure 4:
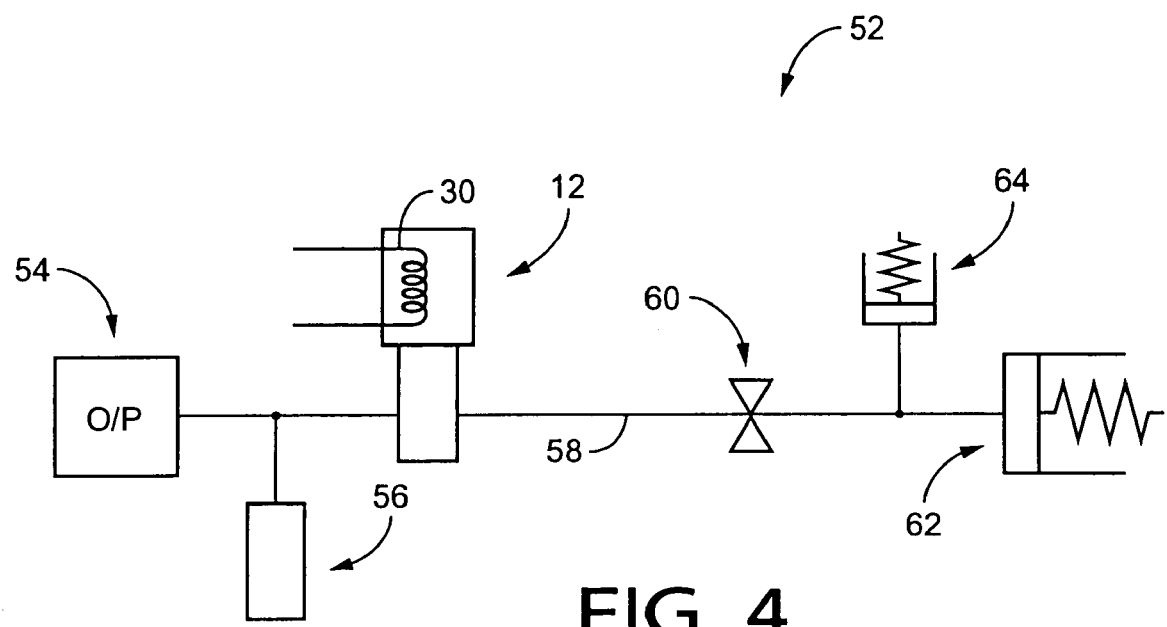
FIG. 4 is a circuit diagram showing the main constituent parts of the hydraulic control circuit in which the linear solenoid valve of FIG. 2 is installed.
Figure 6:
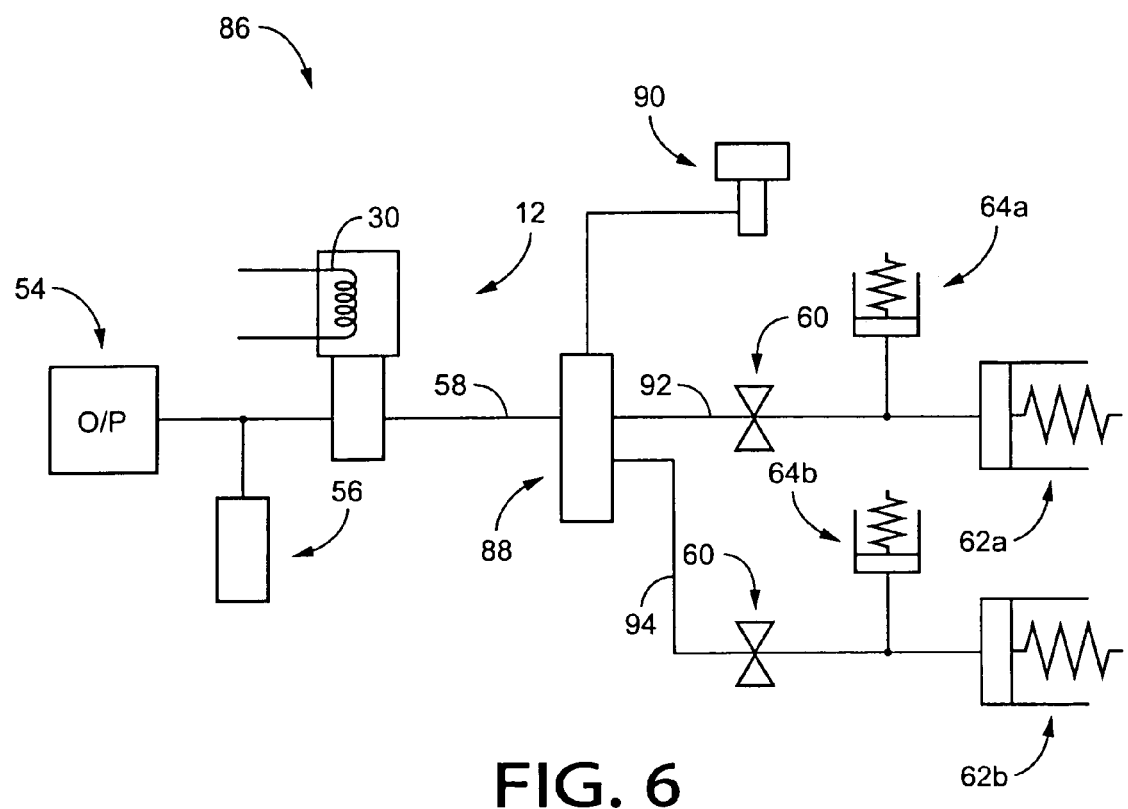
FIG. 6 is a circuit diagram showing the main constituent parts of another hydraulic control circuit in which the linear solenoid valve of FIG. 2 is installed.
Figure 7:
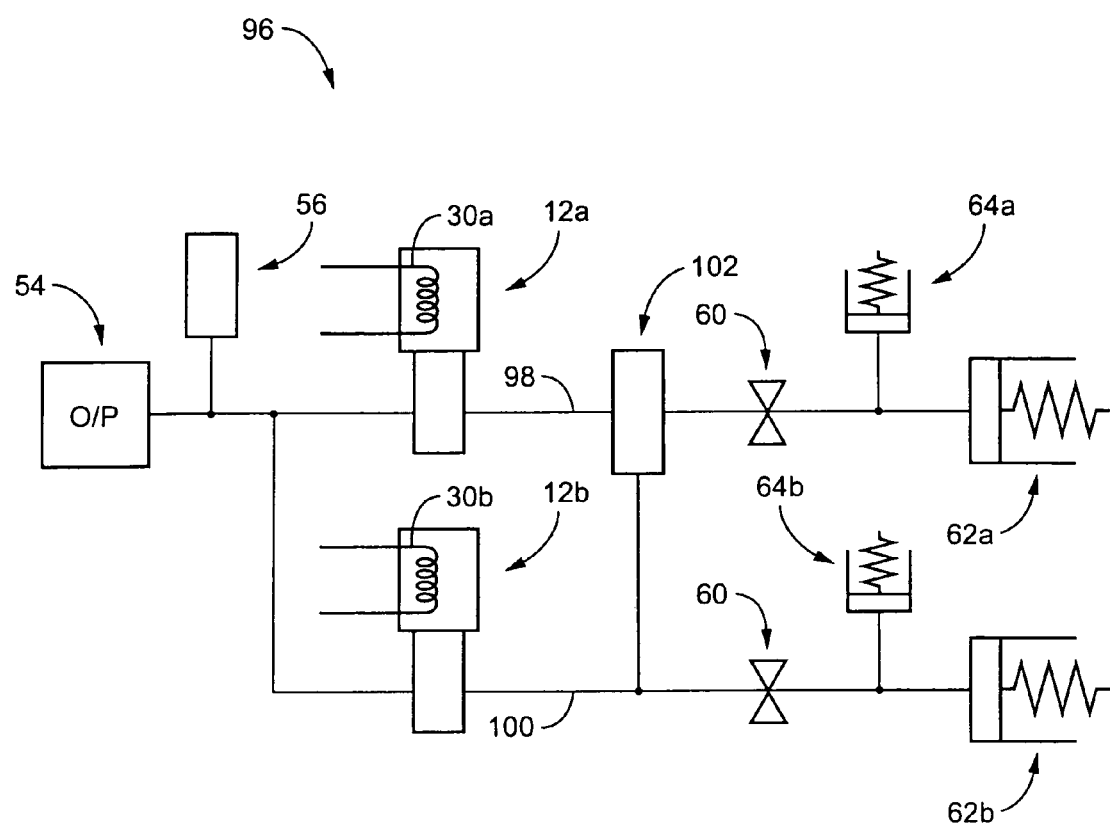
FIG. 7 is a circuit diagram showing the main constituent parts of another hydraulic control circuit in which the linear solenoid valve of FIG. 2 is installed.

This linear solenoid 12 is installed in hydraulic control circuits 52, 86, and 96 which are mainly constructed as shown in FIG. 4, FIG. 6 and FIG. 7. In the hydraulic control circuit 52 as shown in FIG. 4, a regulator valve 56 adjusts the pressure of the hydraulic oil fed under pressure by a hydraulic pump 54 to a predetermined input pressure $P_{IN}$ and then supplies the hydraulic oil to the input port 46 of the linear solenoid valve 12. The pressure of the hydraulic oil input to the input port 46 of the linear solenoid valve 12 is adjusted to a predetermined output pressure $P_{OUT}$ by moving the spool valve element 42 in accordance with the excitation state of the solenoid 24 driven by the electrical drive circuit 10, and then the hydraulic oil thus pressure-adjusted is supplied through an orifice 60 to a clutch 62 and an accumulator 64. The clutch 62 is a hydraulic type friction engaging device whose engaging state is controlled by the hydraulic oil whose pressure is adjusted by the linear solenoid valve 12, and the accumulator 64 is an accumulator for accumulating the pressure of the hydraulic oil whose pressure is adjusted by the linear solenoid valve 12.

Figure 5:
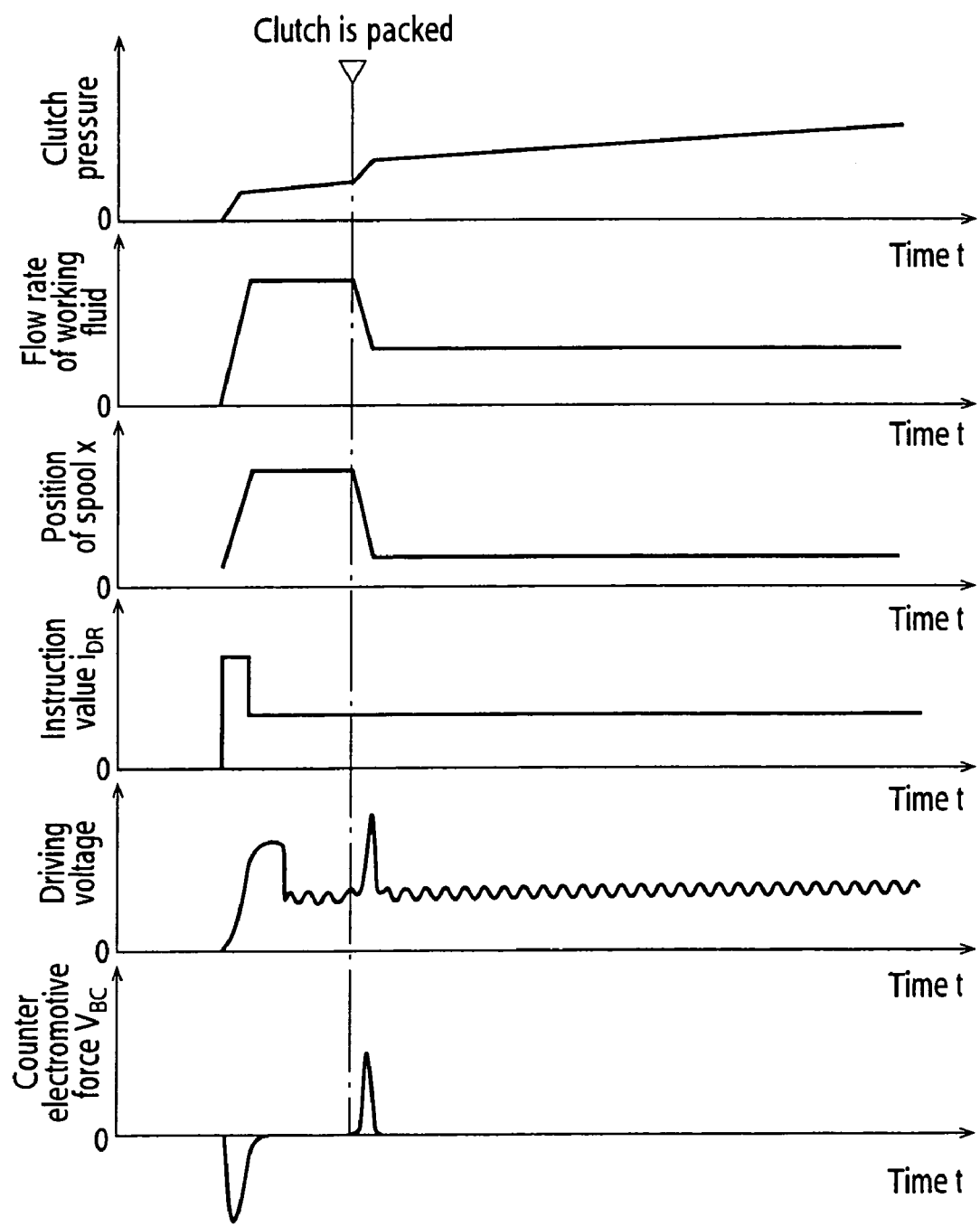
FIG. 5 is a time chart showing the variation of various parameters from start of the supply of hydraulic oil to a clutch equipped to the hydraulic control circuit of FIG. 4.

FIG. 5 is a time chart showing the variation of various parameters from the start of supply of the hydraulic oil to the clutch 62 until the end of the filling. The driving voltage as shown in FIG. 5 is the voltage corresponding to the driving current $I_{DR}$ flowing in the coil 30. The instruction value $i_{DR}$ is a signal to be supplied to the drive current control device 20 to control the current to be supplied into the coil 30, and calculated by an instruction value calculating portion 66 as described later.

As shown in FIG. 5, a so-called first fill control is first carried out, whereby the flow rate of the hydraulic oil output from the output port 50 of the linear solenoid valve 12 quickly increases, and the supply of the hydraulic oil to the clutch 62 is started. At this time, the spool valve element 42 is relatively moved in the x positive direction of FIG. 3 as described above, and thus negative counterelectromotive force $V_{BC}$ is produced so as to prevent the related movement. When the filling of the hydraulic oil into the clutch 62 is finished (a clutch pack is fully filled), the flow rate of the hydraulic oil output from the output port 50 of the linear solenoid valve 12 is quickly reduced. At this time, the spool valve element 42 is relatively moved in an x negative direction of FIG. 3, and thus positive counterelectromotive force $V_{BC}$ is produced so as to prevent the related movement.

As described above, on the basis of the direction (positive or negative) of the counterelectromotive force $V_{BC}$ produced by the movement of the spool valve 42 of the linear solenoid valve 12, it is judged whether the variation of the flow rate of the hydraulic oil is increased or reduced. In FIG. 5, the flow rate of the hydraulic oil is not equal to zero even after the filling of the hydraulic oil into the clutch 62 is finished and the flow rate of the hydraulic oil is quickly reduced because there is some leakage from the clutch 62.

Returning to FIG. 1, an electric control device 65 controls the drive current control device 20, etc., and has various portion as shown in FIG. 1 such as an instruction value calculating portion 66, etc. The instruction value calculating portion 66 calculates the instruction value $i_{DR}$ corresponding to the current to flow into the coil 30 so that the output pressure $P_{OUT}$ from the linear solenoid valve 12 is set to a desired value, and outputs the instruction value $i_{DR}$ thus calculated to the drive current control device 20. The instruction value $i_{DR}$ corresponds to the duty ratio of the duty signal, and the drive current control device 20 controls the duty signal applied to the transistor 14 on the basis of the instruction value $i_{DR}$ calculated by the instruction value calculating portion 66 and the drive current $I_{DR}$ detected by the current detecting device 22 (i.e., actually flowing into the coil 30).

A discriminating portion 67 discriminates components of a predetermined frequency band from the drive current $I_{DR}$ detected by the current detecting device 22 which indicates the electrical state of the electric drive circuit 10. That is, as is apparent from the driving voltage as shown in FIG. 5, the drive current $I_{DR}$ detected by the current detecting device 22 contains not only an oscillation component on the basis of the counter electromotive force $V_{BC}$ produced by the movement of the spool valve element 42, but also an oscillation component on the basis of the dither signal applied to implement a smooth movement of the spool valve element 42 and oscillation components on the basis of noises contaminated due to external influence, etc., and thus the discriminating portion 67 discriminates the current oscillation components of the predetermined frequency band containing the current component corresponding to the counterelectromotive force $V_{BC}$ produced by the movement of the spool valve 42 from the drive current $I_{DR}$ detected by the current detecting device 22.

A flow rate variation detecting portion 68 functions as a displacement detecting portion, and detects the variation of the current corresponding to the counterelectromotive force $V_{BC}$ (i.e., the variation of the electrical state of the electrical drive circuit 10) on the basis of the current oscillation components of the predetermined frequency band discriminated by the discriminating portion 67. Since the counterelectromotive force $V_{BC}$ corresponds to the variation of the input/output flow rate of the hydraulic oil to/from the linear solenoid valve 12, the variation of the current corresponding to the counterelectromotive force $V_{BC}$ corresponds to the variation of the input/output flow rate of the hydraulic oil into/from the linear solenoid valve 12. Therefore, when the flow-in amount is constant, the variation of the current corresponds to the variation of the flow-out rate (in FIG. 4, the flow rate variation of the oil path 58). Furthermore, the variation of the current corresponding to the counterelectromotive force $V_{BC}$ is produced by the movement of the spool valve element 42 (that is, the displacement), and thus the flow rate variation detecting portion 68 detects the displacement of the spool valve 42.

A load element state detecting portion 72 detects the working state of a load element on the basis of a flow-rate variation other than the flow-rate variation caused by the displacement of the spool valve element 42 by the electrical drive circuit 10 in the flow-rate variations of the hydraulic oil detected by the flow rate variation detecting portion 68. Whether the flow-rate variation is caused by the displacement of the spool valve element 42 by the electrical drive circuit 10 or not is made on the basis of a judgment as to whether the instruction value $i_{DR}$ output from the instruction value calculating portion 66 is varied or not.

The load element corresponds to the clutch 62 and the accumulator 64 disposed at the downstream side of the linear solenoid valve 12 in the case of the hydraulic control circuit 52 of FIG. 4, and in this case, the load element state detecting portion 72 includes a filling completion judging portion 74 and a working limit judging portion 76.

The filling completion judging portion 74 judges that the filling of the hydraulic oil into the clutch 62 is completed on the basis of the fact that the reduction of the flow rate of the hydraulic oil is detected by the flow rate variation detecting portion 68 when the instruction value $i_{DR}$ output from the instruction value calculating portion 66 is not varied. The clutch 62 serving as the hydraulic friction engaging device varies its clutch capacitance with time lapse, and when a plurality of clutches 62 are equipped, these clutches are different in clutch capacity due to differences in products. However, if the completion of the filling of the hydraulic oil into the clutch 62 can be judged by the filling completion judging portion 74, the control quality of shift transmission to which strict engaging/releasing timing like clutch-to-clutch or the like is required can be enhanced.

On the basis of the fact that the reduction of the flow rate of the hydraulic oil is detected by the flow rate variation detecting portion 68 when the instruction value $i_{DR}$ output from the instruction value calculating portion 66 is not varied, the working limit judging portion 76 judges that the accumulator 64 reaches the working limit. However, as shown in FIG. 4, the accumulator 64 is normally disposed on an oil path branched from the oil path for supplying the hydraulic oil to the clutch 62 (or brake), and thus by merely detecting the reduction of the flow rate in an oil path 58 corresponding to the upstream side common to the clutch 62 and the accumulator 64, it cannot be judged whether the filling of the hydraulic oil into the clutch 62 is completed or the accumulator 64 reaches the working limit. However, since the clutch capacity of the clutch 62 and the amount of the hydraulic oil supplied until the accumulator 64 reaches the working limit are values on the basis of design, it is known in advance which one of the completion of the filling of the hydraulic oil into the clutch 62 and the arrival of the accumulator 64 at the working limit is earlier. In a case where the state detecting device is designed so that the completion of the filling of the hydraulic oil into the clutch 62 is earlier than the arrival of the accumulator 64 at the working limit, the working limit judging portion 76 judges the arrival of the accumulator 64 at the working limit on the basis of the fact that the second reduction of the flow rate of the hydraulic oil is detected by the flow-rate variation detecting portion 68 after the first fill control is started. The state variations at this time point are omitted from the illustration of the hydraulic oil flow rate and the lower parameters of FIG. 5.

FIG. 6 is a circuit diagram showing the main constituent parts of the hydraulic control circuit 86 installed in the linear solenoid valve 12. In the hydraulic control circuit 86, the hydraulic oil whose pressure is adjusted to the output pressure $P_{OUT}$ by the linear solenoid valve 12 is supplied to a switching valve 88 through the oil path 58. The valve element position of the switching valve 88 is switched between a first position and a second position in accordance with a signal from a solenoid valve 90. At the first position, the output pressure $P_{OUT}$ supplied from the linear solenoid valve 12 is supplied through a first oil path 92 to a first clutch 62a and a first accumulator 64a. At the second position, the output pressure $P_{OUT}$ supplied from the linear solenoid valve 12 is supplied through a second oil path 94 to a second clutch 62b and a second accumulator 64b. When the switching valve 88 is switched on the basis of the signal from the solenoid valve 90 under the state where one clutch 62 and one accumulator 64 are fully filled with the hydraulic oil because they are made to intercommunicate with the oil path 58 through the switching valve 88, supply of the hydraulic oil into the other clutch 62 and the other accumulator 64 is started. The flow rate of the oil path 58 is increased for a while, and when the filling of the hydraulic oil into the clutch 62 is completed and when the accumulator 64 reaches the working limit, the flow rates thereof are reduced. The variation of the flow rates of the hydraulic oil in the oil path 58 are detected by the flow rate variation detecting portion 68.

Returning to FIG. 1, the switching valve abnormality detecting portion 78 is carried out when the electric control device 65 is used to control the hydraulic control circuit 86 having the switching valve 88 as shown in FIG. 6. When the signal for switching the position of the switching valve 88 is output from the solenoid valve 90, under a state where the hydraulic oil is output from the output port 50 of the linear solenoid valve 12, and under the state where the one clutch 62 and the one accumulator 64 are made to intercommunicate with the linear solenoid valve 12 through the switching valve 88 and the oil path 58, so that the clutch 62 and the related accumulator 64 are fully filled, and then the flow rate variation of the hydraulic oil in the oil path 58 (that is, the increase of the flow rate because of the supply of the oil working into the other clutch 62 and the other accumulator 64,) are not detected by the flow rate variation portion 68, the switching valve abnormality detecting portion 78 judges that some abnormality occurs in the switching valve 88.

FIG. 7 is a circuit diagram showing the main constituent parts of a hydraulic control circuit 96 containing a first linear solenoid valve 12a and a second linear solenoid valve 12b which have the same construction as the linear solenoid valve 12. In the hydraulic control circuit 96, the first linear solenoid valve 12a adjusts the pressure of the hydraulic oil having the input pressure $P_{IN1}$ to the output pressure $P_{OUT1}$, and then output the hydraulic oil thus pressure-adjusted to the oil path 98, and supplies the hydraulic oil through a fail safe valve 102 to a first clutch 62a and a first accumulator 64a. The second linear solenoid valve 12b adjusts the pressure of the hydraulic oil having the input pressure $P_{IN2}$ to the output pressure $P_{OUT2}$ and then outputs the hydraulic oil thus pressure-adjusted to the oil path 100, and also supplies the hydraulic oil to the fail safe valve 102 and also to the second clutch 62b and the second accumulator 64b. When both the output pressure $P_{OUT1}$ from the first linear solenoid valve 12a and the output pressure $P_{OUT2}$ from the second linear solenoid valve 12b are supplied, the fail safe valve 102 blocks the output pressure $P_{OUT1}$ from the first linear solenoid valve 12a and also drains the first clutch 62a to prevent the simultaneous engagement of the first clutch 62a and the second clutch 62b. Since the hydraulic oil output from the first linear solenoid valve 12a through the first oil path 98 and the fail safe valve 102 is supplied, the flow rate of the hydraulic oil is not equal to zero as shown in FIG. 5 under a state where the first clutch 62a and the first accumulator 64a are filled with the hydraulic oil. When the fail safe valve 102 operates and the output pressure $P_{OUT1}$ from the first linear solenoid valve 12a is blocked under the above state, the flow rate of the oil path 98 is reduced to zero, and thus the reduction of the flow rate is detected by the flow rate detecting portion 68.

Returning to FIG. 1, a fail safe operation detecting portion 80 is carried out when the electric control device 65 is used to control the hydraulic control circuit 96 having the fail safe valve 102 as shown in FIG. 7, and it detects the reduction of the flow rate by the flow rate detecting portion 68 on the basis of the detection of the reduction of the flow rate by the flow rate detecting portion 68 and also the judgment that the related flow rate reduction is not caused by the control of the solenoid valve 12a by the driving circuit 10 in a predetermined judgment period which is set to the period other than an estimated period during which it is estimated that the filling of the hydraulic oil into the clutch 62 is completed and the accumulator 64 reaches the working limit. Whether the flow-rate reduction is caused by the control of the driving circuit 10 is judged on the basis of a judgment as to whether the instruction value $i_{DR}$ from the instruction value calculating portion 66. When the fail safe valve 102 and the switching valve 88 are equipped at the downstream side of the same linear solenoid valve 12 and also both the switching valve abnormality judging portion 78 and the fail safe operation detecting portion 80 are equipped, the judgment period described above is set to a period from which a predetermined period from output of the signal for controlling the switching valve 88 to the judgment of the abnormality of the switching valve 88.

The input flow-rate judging portion 82 judges that the flow rate of the hydraulic oil input to the input port 46 of the linear solenoid valve 12 is insufficient on the basis of the fact that the flow-rate reduction of the hydraulic oil is detected by the flow-rate variation detecting portion 68 in the time period in which the instruction value $i_{DR}$ output from the instruction value calculating portion 66 keeps a fixed value for instructing the output of a predetermined output pressure $P_{OUT}$ from the output port 50, the working state of the load elements such as the clutch 62, etc., disposed at the downstream side of the linear solenoid valve 12 is impossible to vary, and furthermore, the other flow-rate varying elements which vary the flow-out amount of the hydraulic oil from the linear solenoid valve 12 such as the switching valve 88, etc. In this case, it is estimated that some abnormality occurs in the input pressure supply device such as the hydraulic pump 54 or the like, and thus the input flow-rate judging portion 82 may be called an input pressure supply device abnormality detecting portion for detecting abnormality of the input pressure supply device for supplying the input pressure $P_{IN}$ to the linear solenoid valve 12. The impossibility of the variation of the working mode of the load elements such as the clutch 62, etc., is judged on the basis of the lapse time from the time when a signal for varying the position of the spool valve element 42 of the linear solenoid valve 12 is output by the instruction value calculating portion 66 to fill the hydraulic oil into the load elements or discharge the hydraulic oil from the load elements, and also whether flow-rate varying elements other than the load elements are varied or not is judged on the basis of the time lapse from the time when a signal for driving the flow-rate varying elements is output.

A viscosity estimating portion 84 estimates the viscosity of the hydraulic oil on the basis of the flow-rate variation of the hydraulic oil detected by the flow-rate variation detecting portion 68, that is, the displacement of the spool valve element 42. When the filling of the hydraulic oil in the clutch 62 is completed as shown in FIG. 5, the flow rate of the hydraulic oil is rapidly reduced, so that the position of the spool valve element 42 is varied. Furthermore, although not shown, the arrival of the accumulator 64 at the working limit also reduces the flow rate of the hydraulic oil, and thus the position of the spool valve element 42 is varied. At this time, the moving speed of the spool valve element 42 is influenced by the viscosity of the hydraulic oil. The moving speed of the spool valve element 42 affects the waveform representing the counterelectromotive force $V_{BC}$ and the magnitude of the peak in the current waveform corresponding to the above waveform. Therefore, as the moving speed of the spool valve element 42 is lower, the waveform representing the counterelectromotive force $V_{BC}$ and the current wave corresponding to the waveform have small peaks. Accordingly, the viscosity estimating portion 84 estimates the viscosity of the hydraulic oil on the basis of the magnitude of the current waveform corresponding to the actually detected counterelectromotive force $V_{BC}$ by using a predetermined relationship between the viscosity of the hydraulic oil and the magnitude of the current waveform corresponding to the counterelectromotive force $V_{BC}$. When the filling of the hydraulic oil in the clutch 62 is completed, large counterelectromotive force $V_{BC}$ can be detected. Therefore, it is preferable to estimate the viscosity of the hydraulic oil on the basis of the current corresponding to the counterelectromotive force $V_{BC}$. Furthermore, even when the instruction value $i_{DR}$ is rapidly increased to supply the hydraulic oil to the clutch 62, the position of the spool valve element 42 is varied, so that the counterelectromotive force $V_{BC}$ is produced. However, even-in the case of the same variation of the instruction value $i_{DR}$, the moving speed of the spool valve element 42 is lowered as the viscosity of the hydraulic oil is increased. Therefore, the viscosity of the hydraulic oil may be estimated on the basis of the variation of the current corresponding to the counterelectromotive force $V_{BC}$ detected when the hydraulic oil is supplied to the clutch 62. The predetermined relationship described above is varied when the pattern of the instruction value $I_{DR}$, the capacity of the clutch 62, the capacity of the accumulator 64, etc., are varied. The viscosity of the hydraulic oil estimated by the viscosity estimating portion 84 is directly the viscosity of the hydraulic oil in the portion of the linear solenoid valve 12. However, the viscosity of the hydraulic oil flowing in the hydraulic control circuit is generally determined by temperature, and there is no partial deviation and thus substantially uniform in the temperature of the hydraulic oil. Therefore, the viscosity of the hydraulic oil estimated by the viscosity estimating portion 84 represents the viscosity of the hydraulic oil of the overall hydraulic control circuit.

As described above, according to this embodiment, the load element state detecting portion 72 detects the completion of the filling of the hydraulic oil into the clutch 62 and the working limit of the accumulator 64 on the basis of the displacement of the spool valve element 42 which is not associated with the driving of the electric drive circuit 10. That is, since the completion of the filling of the hydraulic oil into the clutch and the working limit of the accumulator 64 are directly detected, so that the completion of the filling of the hydraulic oil into the clutch 62 and the working limit of the accumulator 64 can be detected with high precision regardless of differences among products and the time-lapse variation. Furthermore, they can be detected without equipping any special device to the hydraulic control circuit, and thus there is an advantage that the device construction is simple.

Furthermore, as shown in FIG. 6, when the switching valve 88 is disposed in the flow path between the solenoid valve 12 and the load elements (clutch 62 and the accumulator 64), the abnormality of the switching valve 88 can be detected on the basis of the displacement of the spool valve element 42 and the instruction value $i_{DR}$ for driving the solenoid valve 12 by the switching valve abnormality detecting portion 78.

When the fail safe valve 102 for preventing the simultaneous engagement of the two clutches 62a and 62b is equipped in the oil path between the solenoid valve 12a and the load elements (the clutch 62 and the accumulator 64) as shown in FIG. 7, the abnormality of the fail safe valve 102 can be detected on the basis of the displacement of the spool valve element 42 and the instruction value $i_{DR}$ for driving the solenoid valve 12.

According to this embodiment, the source pressure abnormality of the solenoid valve 12 can be judged on the basis of the displacement of the spool valve element 42 and the instruction value $i_{DR}$ for driving the solenoid valve 12.

According to this embodiment, the viscosity of the hydraulic oil can be estimated on the basis of the displacement of the spool valve element 42 which can be detected without equipping any special device to the hydraulic control circuit, and thus the viscosity of the hydraulic oil in the hydraulic control circuit can be estimated with a simple construction. Furthermore, when the viscosity of the hydraulic oil is estimated on the basis of the displacement of the spool valve element 42 at the time when the filling of the clutch 62 having a large displacement of the spool valve element 42 because the flow-rate variation of the hydraulic oil is large is completed or when the accumulator 64 reaches the working limit, the viscosity of the hydraulic oil can be estimated at high precision.

Figure 8:
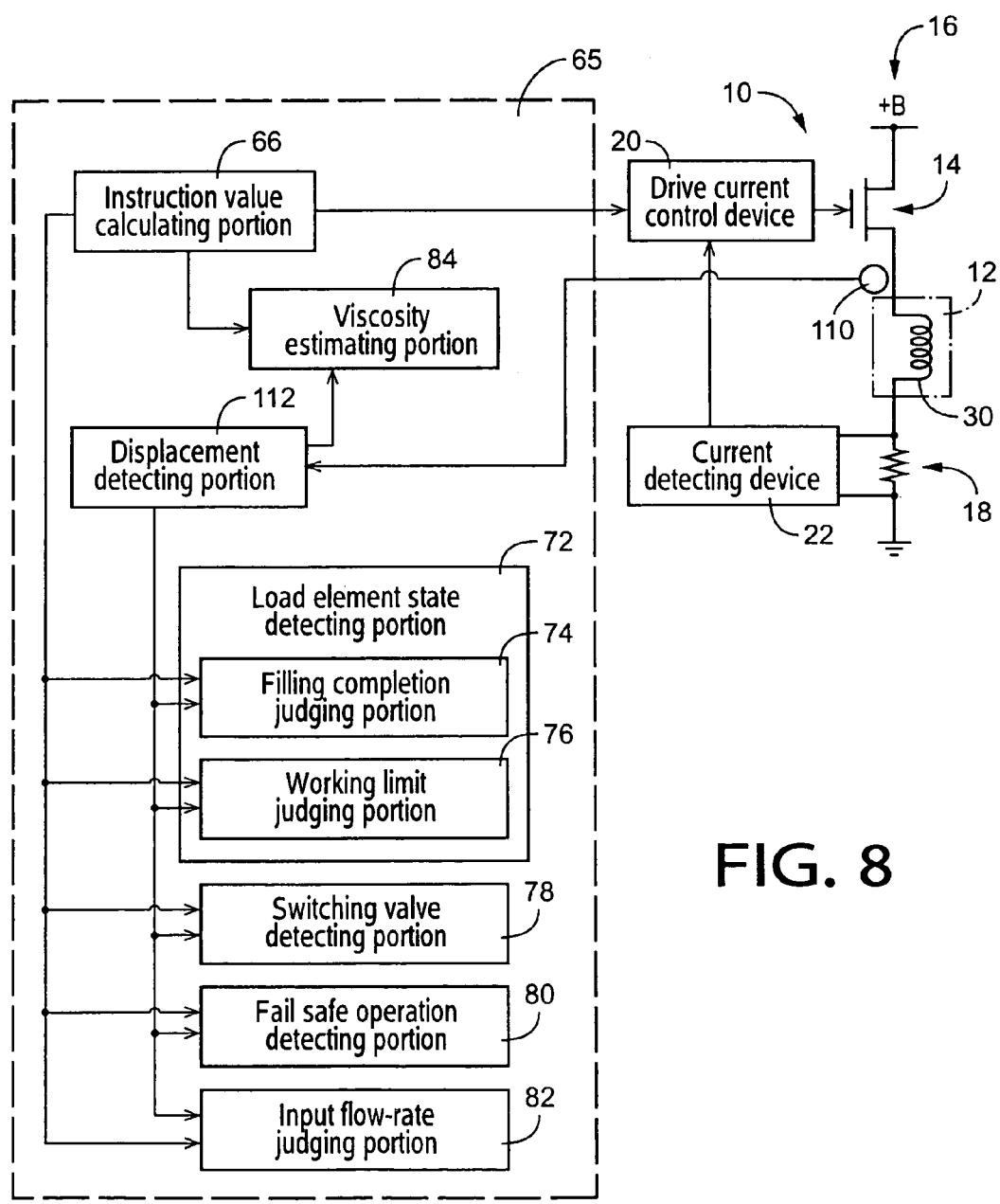
FIG. 8 is a conceptual diagram showing the construction of another state detecting device for a load element and a hydraulic control circuit which is different from FIG. 1.

Next, another embodiment of the present invention will be described. FIG. 8 is a conceptual diagram showing the construction of another state detecting device which is different from that of FIG. 1. In FIG. 8, a different point from FIG. 1 is that the discriminating portion 67 and the flow-rate variation detecting portion 68 are not equipped, and a position sensor 110 and a displacement detecting portion 112 are equipped in place of the above elements. The point of deference from FIG. 1 will be described.

A position sensor 110 functions as a position detecting portion. It detects the position in the x-direction in FIG. 3 of the spool valve element 42 of the solenoid valve 12 or the core 32, and supplies the signal representing the position to the electric control device 65. A displacement detecting portion 112 successively judges the position of the spool valve element 42 on the basis of the signal supplied from the position sensor 110, and further detects the displacement of the spool valve element 42 from the position of the spool valve 42. The displacement detecting portion 112 corresponds to the flow-rate detecting portion 68 of FIG. 1, and the same effect as the above-described embodiment can be achieved.

The preferred embodiments of the present invention have been described in detail with reference to the drawings. However, the present invention is not limited to the embodiments, and can be carried out with other embodiments.

For example, in the second embodiment described above, the position sensor is equipped to detect the position of the spool valve element 42. However, the core 32 is moved in connection with the movement of the spool valve element 42, and the inductance of the coil 30 is different in accordance with the core 32. Therefore, the position of the spool valve element 42 may be detected on the basis of the inductance of the coil 30.

Furthermore, in the above-described embodiments, the current variation is detected as the electric state variation of the electric control circuit 10, however, the voltage variation may be detected as the electric state variation.

Still furthermore, in the above-described embodiments, the state detecting device for the hydraulic control circuit using the hydraulic oil as the working fluid has been mainly described. However this is one of the preferable embodiments, and for example, the present invention may be applied to a state detecting device for a hydraulic control circuit using water as the working fluid.

In the above-described embodiments, the instruction value calculating portion 66, the flow-rate variation detecting portion 68, the discriminating portion 67, the load element state detecting portion 72, the filling completion judging portion 74, the working limit judging portion 76, the switching valve abnormality detecting portion 78, the fail safe working detecting portion 80, the input flow-rate judging portion 82 and the viscosity estimating portion 84 are the control functions of the electric control device 65. However, a portion for implementing the same controls as these portion by a predetermined electric circuit may be used. Furthermore, the driving current control device 20 and the current detecting device 22 are installed in the electric drive circuit 10, however, the same controls as these devices may be carried out by the electric control device 65.

Furthermore, in the above-described embodiments, a dither signal of 300 Hz in frequency is supplied to the driving current $I_{DR}$ flowing in the coil 30, and no dither signal is necessary to be equipped in some modes employed of the hydraulic control circuit 52, or a normal DC current may be made to flow into the coil 30.

Other various modifications may be made without departing from the spirit and scope of the present invention although these are not individually described.

What is claimed is:

1. A state detecting device for detecting a state of a load element receiving working fluid whose pressure is adjusted by an electromagnetic pressure-regulating valve equipped to a fluid pressure control circuit,
   wherein the electromagnetic pressure-regulating valve has a spool movable in accordance with an excitation state of a solenoid of the valve driven by a electrical drive circuit, an input port, a drain port, an output port, and a feedback chamber into which output pressure output from the output port thereof is fed back for regulating the output pressure by applying to the spool
   wherein an inter connecting state of the output port and one of the input port or the drain port is switched by the movement of the spool,
   and wherein the state detecting device includes an instruction value calculating portion which calculates the instruction value supplied to the electrical drive circuit to drive the electromagnetic pressure-regulating valve,
   a displacement detecting portion for detecting the displacement of the spool, and
   a load element state detecting portion for detecting the state variation of the load element on the basis of a displacement of the spool which is detected by the displacement detecting portion and is non-associated with the driving of the electrical drive circuit, when the instruction value supplied from the instruction value calculating portion is not varied.

2. The load element state detecting device according to claim 1,
   further comprising a position detecting portion for detecting the position of the spool,
   wherein the displacement detection portion detects the displacement of the spool on the basis of the output of the position detecting portion.

3. The load element state detecting device according to claim 1,
   the displacement detecting portion detects the displacement of the spool on the basis of the electric state variation of the electrical drive circuit.

4. The load element state detecting device according to any of claim 1,
   wherein the load element is composed a fluid pressure type frictional engaging device whose engagement state is controlled by working fluid having pressure adjusted by the electromagnetic pressure-regulating valve,
   and the load element state detecting portion comprises a filling completion judging portion for judging on the basis of the displacement of the spool whether filling of the working fluid into the fluid pressure type friction engaging device is completed or not.

5. The load element state detecting device according to any of claim 1,
   wherein the load element comprises an accumulator for accumulating the pressure of the working fluid whose pressure is adjusted by the electromagnetic adjusting valve,
   and the load element state detecting port includes a working limit judging portion for judging on the basis of the displacement of the spool whether the accumulator reaches the working limit.

6. The load element state detecting device according to any of claim 1,
   wherein the fluid pressure control circuit includes a switching valve which is disposed in a flow path between the electromagnetic pressure-regulating valve and the load element and switches the flow path of the working fluid whose pressure is adjusted by the electromagnetic pressure-regulating valve,
   further comprising a switch valve abnormality detecting portion for detecting abnormality of the switching valve on the basis of the displacement of the spool detected by the displacement detecting portion, when the instruction value of the electrical driving circuit supplied by the instruction value calculating portion is set to a value for supplying the working fluid to the load element.

7. The load element state detecting device according to any of claim 1,
   wherein the fluid pressure control circuit has a fail safe valve which is disposed in a fluid path between the electromagnetic pressure-regulating valve and the load element and receives working fluid whose pressure is adjusted by the electromagnetic pressure-regulating valve, thereby preventing simultaneous engagement of a plurality of fluid pressure type friction engaging devices,
   further comprising a fail safe actuation detection portion for detecting the presence or absence of a fail safe action of the fail safe valve on the basis of the displacement of the spool detected by the displacement detecting portion when the instruction value of the electrical driving circuit supplied by the instruction value calculating portion is set to a value for supplying the working fluid to the load element.

8. The load element state detecting device according to any of claims 1,
- comprising a input flow rate judging portion for judging whether the flow rate of the working fluid input to the electromagnetic pressure adjusting valve is sufficient or not, on the basis of the displacement of the spool detected by the displacement detecting portion, when the instruction value supplied by the instruction value calculating portion is equal to a fixed value.

9. A fluid pressure control circuit state detecting device for detecting the state of a fluid pressure control circuit having
- an electromagnetic pressure adjusting valve for adjusting the pressure of working fluid in a flow path by moving a spool in accordance with an excitation state of a solenoid driven by a electrical drive circuit,
- wherein the fluid pressure control circuit has a load element receiving the working fluid whose pressure is adjusted by the electromagnetic pressure adjusting valve,
- further comprising a displacement detecting portion for detecting the displacement of the spool; and
- a viscosity estimating portion for estimating the viscosity of the working fluid,
- wherein the viscosity estimating portion estimates the viscosity of the working fluid on the basis of the moving speed of the spool which is detected when the load element is fully filled.

10. The fluid pressure control circuit state detecting device according to claim 9,
- wherein the load element is composed of a fluid pressure type frictional engaging device whose engagement state is controlled by working fluid whose pressure is adjusted by the electromagnetic-regulating valve.

11. The fluid pressure control circuit state detecting device according to claim 9,
- wherein the load element comprises an accumulator for accumulating the pressure of the working fluid whose pressure is adjusted by the electromagnetic-regulating valve.

* * * * *